United States Patent [19]
Ulics

[11] 3,926,469
[45] Dec. 16, 1975

[54] CAB ROOF TO BOTTOM OF COMPARTMENT SEAL

[75] Inventor: George Ulics, Dearborn, Mich.

[73] Assignee: Ford Motor Company, Dearborn, Mich.

[22] Filed: May 13, 1974

[21] Appl. No.: 469,581

[52] U.S. Cl. .................. 296/23 R; 49/489; 49/495; 296/99
[51] Int. Cl.² .......................................... B60P 3/32
[58] Field of Search ........... 296/23 MC, 23 R, 35 R, 296/35 A, 99, 28 K; 49/489, 495, 498

[56] References Cited
UNITED STATES PATENTS

| | | | |
|---|---|---|---|
| 2,188,815 | 1/1940 | Murphy | 49/495 |
| 2,779,070 | 1/1957 | Keller | 49/489 |
| 2,910,209 | 10/1959 | Nelson | 49/495 |
| 2,926,042 | 2/1960 | Calthorpe | 296/23 R |
| 3,297,355 | 1/1967 | Robinson | 296/23 MC |
| 3,494,656 | 2/1970 | McIntire | 296/23 R |

*Primary Examiner*—Robert J. Spar
*Assistant Examiner*—Gary Auton
*Attorney, Agent, or Firm*—John J. Roethel; Keith L. Zerschling

[57] ABSTRACT

An extruded elastomeric sealing strip for use between spaced portions of two abutting panels, at least one of the spaced portions having an arcuate surface. The sealing strip comprises an elongated semi-cylindrical body portion adapted to be adhesively secured in a complementary recess in the other of the panels. The body portion has a diametrical base portion from which a plurality of longitudinally extending ribs project. The outermost of the ribs comprise lateral flange extensions of the base portion. The intermediate ribs are symmetrically shaped and positioned between the outermost ribs. All ribs have biasing engagement with the one panel arcuate surface.

2 Claims, 3 Drawing Figures

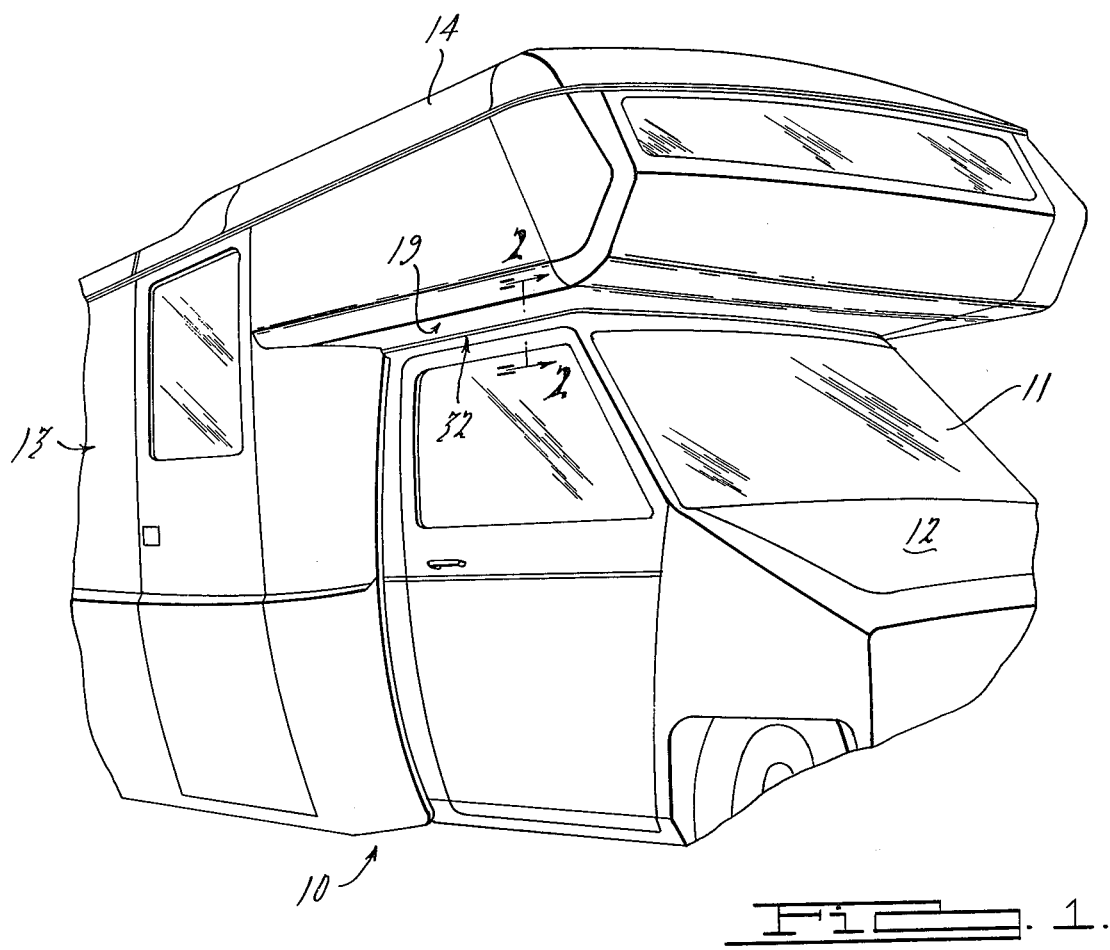
FIG. 1.
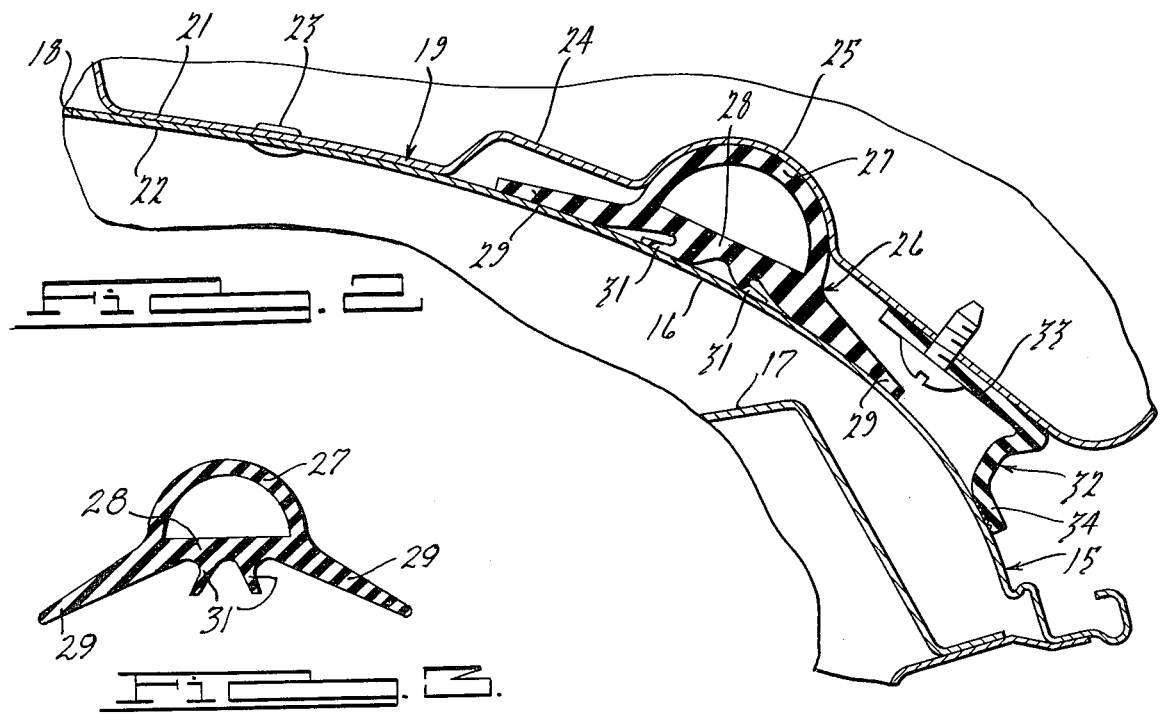
FIG. 2.
FIG. 3.

3,926,469

CAB ROOF TO BOTTOM OF COMPARTMENT SEAL

BACKGROUND OF THE INVENTION

It has been conventional practice for many years in the truck industry to assemble the vehicle chassis, vehicle operator's cab and the engine components as a unit. The body structures housing the cargo compartments do not readily lend themselves to standardization. Accordingly, the chassis assemblies are delivered to shops specializing in the fabrication of body structures to be mounted on the chassis. A major market for the chassis units has been the recreational vehicles which includes camper units adapted to be removably mounted on pick-up trucks and permanent motor homes of considerable size. Intermediate size units include a camper unit having a forward extension compartment adapted to be permanently attached to the rear and top panel of the vehicle operator's cab. The roof panel is cut away to reduce the crown or vertical height of the cab beneath the overlying extension compartment. This technique of mounting the extension compartment over the cab necessitates a suitable weatherstrip or seal between the opposed perimetrical surfaces of the roof panel and underside of the extension compartment.

It is an object of the present invention to provide a seal that will have a relatively low unit pressure on the cab roof surface while providing a wide contact seal area.

SUMMARY OF THE INVENTION

The present invention relates to an elastomeric sealing strip for use between spaced portions of two abutting panels, at least one of the panels having an arcuate surface. This panel relationship may be found in a recreational vehicle or a cargo carrying vehicle in which a forward extension compartment is mounted over the roof of the vehicle operator's cab. The sealing strip comprises an elongated semi-cylindrical body portion adapted to be adhesively secured in a complementary recess in the other or non-arcuate panel. The sealing strip body portion has a diametrical base portion from which a plurality of longitudinally extending ribs project. The outermost of the ribs comprise lateral flange extensions of the base portion. The intermediate ribs are symmetrically shaped and positioned between the outermost ribs. All of the ribs have biased engagement with the one panel arcuate surface.

DESCRIPTION OF THE DRAWINGS

Further features and advantages of the present invention will be made more apparent as this description proceeds, reference being had to the accompanying drawings wherein:

FIG. 1 is a perspective view of a portion of a vehicle having a forward extension compartment mounted over the vehicle operator's cab, FIG. 2 is a section view on the line 2—2 of FIG. 1, and FIG. 3 is a cross-sectional of the sealing strip per se in the free position of the latter.

DETAILED DESCRIPTION OF THE INVENTION

Referring now to the drawing, the numeral 10 denotes a recreational vehicle comprising a vehicle operator's cab 11 which also houses beneath a hood portion 12 the vehicle engine (not visible). To the rear of the cab 11 is a camper unit 13 having a forward extension compartment 14 supported above the cab roof exterior panel 15, see FIG. 2. The extension compartment 14 provides sleeping area for the camper unit or additional cargo carrying area for a truck having a similar configuration.

The cab exterior panel 15 curves downwardly to provide an arcuate marginal portion 16 adjacent the outer perimeter of the roof structure. This is the area above the side roof rail 17. The center portion of the panel 15 is cut away, as at 18, to reduce the crown height of the cab 11.

The camper forward extension compartment 14 has an outer base panel 19 having a portion 21 inwardly of the perimeter complementary to the inner portion 22 of the cab roof exterior panel 15. The two panel portions 21–22 are secured to each other by a plurality of pop or blind rivets as indicated at 23. The compartment base panel 19 is formed with an upwardly stepped portion 24 which lies in spaced relationship to the arcuate surface of the cab roof exterior panel portion 16. The stepped portion 24 is formed with a downwardly facing concave recess 25 that receives part of a sealing strip 26.

The sealing strip 26 is an elongated extrusion having a cross-section as best seen in FIG. 2 and FIG. 3. As shown, the sealing strip 26 comprises a hollow semi-cylindrical body portion 27 having a diametrical base wall 28. The curved side of the body portion 27 is complementary to and fits within the concave recess 25 of the panel section 24. The body portion 27 is adhesively retained within the recess 25.

Projecting downwardly from the base wall 28 of the sealing strip 26 are a plurality of longitudinally extending sealing ribs spaced in a symmetrical pattern. The outermost of the ribs, the latter being designated 29, extend laterally of the body portion. In the free state particularly as shown in FIG. 3, the ribs 29 extend downwardly and outwardly at an acute angle approximately 30°. The ribs 31 between the outer ribs 29 are somewhat shorter and extend downwardly in the free state at an angle approximately 60°. The ribs 31 are equally spaced on opposite sides of the center of the base wall 28.

When the panels 15 and 19 are assembled, the ribs 29–31 are somewhat flattened out so as to be biased against the surface of the arcuate marginal surface of the cab roof exterior panel in sealing relationship thereto.

Also shown in FIG. 2 is an outer seal 32 comprising a L-shaped extrusion with the long leg 33 of the L screwed to the panel section 24 and the base leg 34 biased against the exterior panel. The outer seal functions primarily as a concealment skirt hiding the gap between the panels 15 and 19.

It is to be understood this invention is not limited to the exact construction illustrated and described above, and that various changes and modifications may be made without departing from the spirit and scope of the invention as defined by the following claims.

I claim:

1. In combination, a motor vehicle cab roof, a forward extension compartment supported above the cab roof, and flexible sealing strip interposed between the cab and the compartment, the cab roof having an exterior panel with an arcuate marginal portion adjacent the perimeter thereof, the forward extension compartment having a base wall with a marginal strip overlying in spaced relation the arcuate marginal portion of the cab roof exterior panel, the base wall marginal strip having a cylindrical recess paralleling the perimeter thereof, the sealing strip comprising:

a semi-cylindrical body portion having a diametrical base wall, the curved side of the body portion being complementarily fitted within the marginal strip semi-cylindrical recess and adhesively secured therein, and a plurality of longitudinally extending sealing ribs symmetrically spaced across the diametrical base wall and biased against the arcuate marginal portion of the cab roof exterior panel in sealing relationship thereto, the outermost of the ribs extending laterally of the base wall at an acute angle to the latter in a direction to contact the surface of the arcurate marginal portion of the cab roof exterior panel; interposed between the outermost ribs are a pair of substantially shorter ribs extending at a greater acute angle than the outer ribs to the surface of the exterior panel, each shorter rib when in contact with the exterior panel surface being flexed substantially in the same direction as the proximate outer rib.

2. In combination, according to claim 1, in which: the body portion of the sealing strip is hollow.

* * * * *